(12) United States Patent
Lin et al.

(10) Patent No.: US 11,933,359 B1
(45) Date of Patent: Mar. 19, 2024

(54) MINIATURE LINEAR GUIDEWAY

(71) Applicant: HIWIN TECHNOLOGIES CORP., Taichung (TW)

(72) Inventors: Jian-Ting Lin, Taichung (TW); Yung-Chin Chu, Taichung (TW)

(73) Assignee: HIWIN TECHNOLOGIES CORP., Taichung (TW)

(*) Notice: Subject to any disclaimer, the term of this patent is extended or adjusted under 35 U.S.C. 154(b) by 0 days.

(21) Appl. No.: 17/898,828

(22) Filed: Aug. 30, 2022

(51) Int. Cl.
*F16C 29/06* (2006.01)

(52) U.S. Cl.
CPC ................ *F16C 29/0607* (2013.01)

(58) Field of Classification Search
CPC .. F16C 26/06; F16C 26/0602; F16C 26/0633; F16C 26/0635; F16C 26/0638; F16C 26/064; F16C 26/0652; F16C 26/0654; F16C 26/0657; F16C 26/0607
See application file for complete search history.

(56) References Cited

U.S. PATENT DOCUMENTS

| | | | |
|---|---|---|---|
| 4,253,709 A | 3/1981 | Teramachi | |
| 4,784,498 A * | 11/1988 | Geka | F16C 29/065 384/44 |
| 5,544,954 A | 8/1996 | Osawa | |
| 9,068,601 B2 * | 6/2015 | Mizumura | F16C 29/0602 |
| 10,174,787 B2 * | 1/2019 | Sakai | F16C 29/06 |

FOREIGN PATENT DOCUMENTS

| | | |
|---|---|---|
| JP | S60-088219 A | 5/1985 |
| JP | 2632126 B2 | 7/1997 |
| JP | 2005-003102 A | 1/2005 |
| JP | 3195639 U | 1/2015 |
| TW | I440784 B | 6/2014 |

* cited by examiner

*Primary Examiner* — James Pilkington
(74) *Attorney, Agent, or Firm* — MUNCY, GEISSLER, OLDS & LOWE, PC

(57) ABSTRACT

A miniature linear guideway includes a rail, a slider, two circulation fittings and a retainer. The slider and the circulation fitting are set on the rail, so that a circulation channel is formed between the rail and the slider for the balls to run. The circulation fitting has several turning convex portions. The retainer has a plate portion and two retaining portions. The two ends of each retaining portion are connected to the plate portion by a positioning portion, and the plate portion is adjacent to the slider. The positioning portions of the retainer abut the turning convex portions. The width of the plate portion of the retainer is smaller than the distance between the turning convex portions of the circulation fitting. Thereby, the miniature linear guideway of the present invention can optimize the assembly efficiency, thereby realizing the purpose of automatic assembly.

10 Claims, 23 Drawing Sheets

MINIATURE LINEAR GUIDEWAY

BACKGROUND OF THE INVENTION

1. Field of the Invention

The present invention relates to linear guideway technology and more particularly, to a miniature linear guideway that can optimize assembly efficiency.

2. Description of the Related Art

The retainer disclosed in JP 2632126 B2 is a closed curve formed by two locking portions and two straight portions. The retainer is a metal wire, which is formed by segmental molding and then welded or bonded, which is more troublesome in manufacturing. In addition, because the overall configuration is relatively weak, it is not easy to take and assemble, and it is easy to damage and deform, resulting in poor holding effect, and may even press the balls and cause unsmooth operation.

The retainer disclosed in TW 1440784 is composed of a holding portion and two hooks, and each end cover is provided with a hook groove corresponding to the hook and a guide surface adjacent to the hook groove. The guide surface has an inclined angle relative to the end cover, and the assembly resistance is reduced by the setting of the inclined angle. However, the retainer itself is too small and difficult to take, and the resistance at the end of the guide surface is still large, which makes it difficult to assemble. In addition, the retainer presents a multi-segment curved configuration, which is easily entangled with each other, and often requires additional steps for separation, thus increasing invisible costs.

The retainer disclosed in U.S. Pat. No. 5,544,954 includes a linear portion and two arc-shaped locking portions. Because the retainer itself is a small steel wire, it is not easy to take. In addition, when the retainer is installed in the arc-shaped grooves of the two end cover with the arc-shaped locking portions at both ends, it is not only difficult to align, but also requires a certain force to be pressed in, so it is inconvenient to assemble.

On the other hand, for the miniature linear guideway with a height of about 1 cm and a width of about 2 cm (or even smaller size), it is all manual work when assembling the retainer. However, due to the small size and the limitation of manual work, there is still room for improvement in assembly efficiency and production capacity.

SUMMARY OF THE INVENTION

The present invention has been accomplished under the circumstances in view. It is the main object of the present invention to provide a miniature linear guideway, which can optimize the assembly efficiency to achieve the purpose of automatic assembly.

To achieve this and other objects of the present invention, a miniature linear guideway of the present invention comprises a rail, a slider, at least one circulation fitting, a plurality of balls, and a retainer. The slider is slidably arranged on the rail. The slider comprises a middle portion, and two side portions connected to two opposite sides of the middle portion. The circulation fitting is slidably disposed on the rail and connected to the slider, so that the circulation fitting forms a circulation channel between the rail and each of the side portions of the slider. The circulation fitting comprises a plurality of turning convex portions. The balls are located in the circulating channels. The retainer comprises a plate portion, a plurality of positioning portions and two retaining portions. Two ends of each of the retaining portions are respectively connected to the plate portion by one respective positioning portion. The plate portion of the retainer is adjacent to the middle portion of the slider. The positioning portions of the retainer abut against the turning convex portions of the circulation fitting. Each of the retaining portions of the retainer abuts against the balls. The width of the plate portion of the retainer is smaller than the distance between the turning convex portions of each circulation fitting.

As can be seen from the above, the miniature linear guideway of the present invention presses the retainer in the direction of the slider to complete the assembly with the slider, which is relatively easy to assemble, thereby improving assembly efficiency and reducing assembly costs, thereby realizing the goal of automated assembly.

Preferably, the rail has each of two sides thereof respectively provided with a first rolling groove and a retaining groove adjacent to the first rolling groove. Each side portion of the slider is provided with a second rolling groove. The second rolling grooves of the slider correspond to the first rolling grooves of the rail one-to-one, so that a load channel is formed between the second rolling grooves of the slider and the first rolling grooves of the rail respectively. Each side portion of the slider comprises a non-load channel. Each of the non-load channels penetrates two opposite end faces of the side portion. The number of the at least one circulation fitting is two, and the two circulation fittings are arranged on two opposite end faces of the slider. Each circulation fitting comprises two turning convex portions and two return grooves. Each return groove is adjacent to one respective turning convex portion. Two ends of each return groove are connected to one end of the load channel and one end of the non-load channel, so that the load channel, the non-load channel and the two return grooves together form one circulating channel. Each of the retaining portions of the retainer is located in one respective retaining groove of the rail and abuts balls passing through one load channel.

Preferably, the rail has each of two sides thereof respectively provided with a first rolling groove and a retaining groove adjacent to the first rolling groove. Each side portion of the slider comprises two parallel second rolling grooves and two opposite first return grooves. A load channel is formed between one second rolling groove of each side portion of the slider and one respective first rolling groove of the rail. The number of the at least one circulation fitting is one. The circulation fitting further comprises two opposite socket grooves and four turning convex portions. A third rolling groove and two opposite second return grooves are set around each socket groove. The second return grooves are connected to both ends of the third rolling groove. One of the second rolling grooves of each side portion of the slider corresponds to one respective first rolling groove of the rail, and the other second rolling groove of each side portion of the slider corresponds to one third rolling groove of the circulation fitting. The first return grooves of each of the side portions of the slider correspond to the second return grooves of the circulation fitting, so that one of the first rolling groove, the second rolling grooves, one third rolling groove, the first return grooves and the second return grooves together form one circulating channel. Each of the second return grooves is adjacent to one of the turning convex portions. Each of the second return grooves is connected to one load channel, The retaining portions of the retainer are respectively located in the retaining grooves of the rail and abut the balls passing through one load channel.

Preferably, the slider comprises a recess located on a bottom surface of the middle portion. The retainer integrally protrudes upward from the plate portion with a convex portion. The convex portion of the retainer is simultaneously embedded in the recess of the slider. This can improve the positioning effect between the two.

Preferably, each circulation fitting further comprises a plurality of positioning blocks. Each of the positioning blocks protrudes from one of the turning convex portions along the extending direction of the rail. The positioning portions of the retainer are engaged with the positioning blocks of the at least one circulation fitting in a one-to-one manner. This can improve the positioning effect between the two.

Preferably, the retainer further comprises a plurality of wing portions. The wing portions extend from the respective positioning portions in a direction away from the plate portion and respectively abut against an outer end surface of each circulation fitting to improve the structural stability of the retainer.

Preferably, the outer end surface of each circulation fitting is provided with a plurality of positioning posts. Each wing portion of the retainer is provided with a positioning hole. The positioning holes of the retainer are respectively engaged with the positioning posts of the at least one circulation fitting.

Preferably, the retainer further comprises a plurality of wing portions, each said wing portion extending upward from one end of the retaining portion and abutting on an outer end surface of the at least one circulation fitting to improve the structural stability of the retainer.

Preferably, the cross-sectional shape of each retaining portion is rectangular, and the width-to-thickness ratio of each retaining portion is not less than 1.5. This ensures that the retaining portion has sufficient structural strength and is not easily deformed, so as to provide a good retaining effect.

Preferably, the cross-sectional shape of each said positioning portion is rectangular, and the length-to-thickness ratio of each said positioning portion is not less than 1.5. In this way, it can be ensured that each of the positioning portions has sufficient structural strength and is not easily deformed, so as to provide a good positioning effect.

The detailed structure, features, assembly or use of the miniature linear guideway provided by the present invention will be described in the detailed description of the subsequent implementation. However, those with ordinary knowledge in the field of the present invention should be able to understand that these detailed descriptions and specific embodiments listed in the implementation of the present invention are only used to illustrate the present invention, and are not intended to limit the scope of the patent application of the present invention.

DETAILED DESCRIPTION OF THE INVENTION

Figure 1:
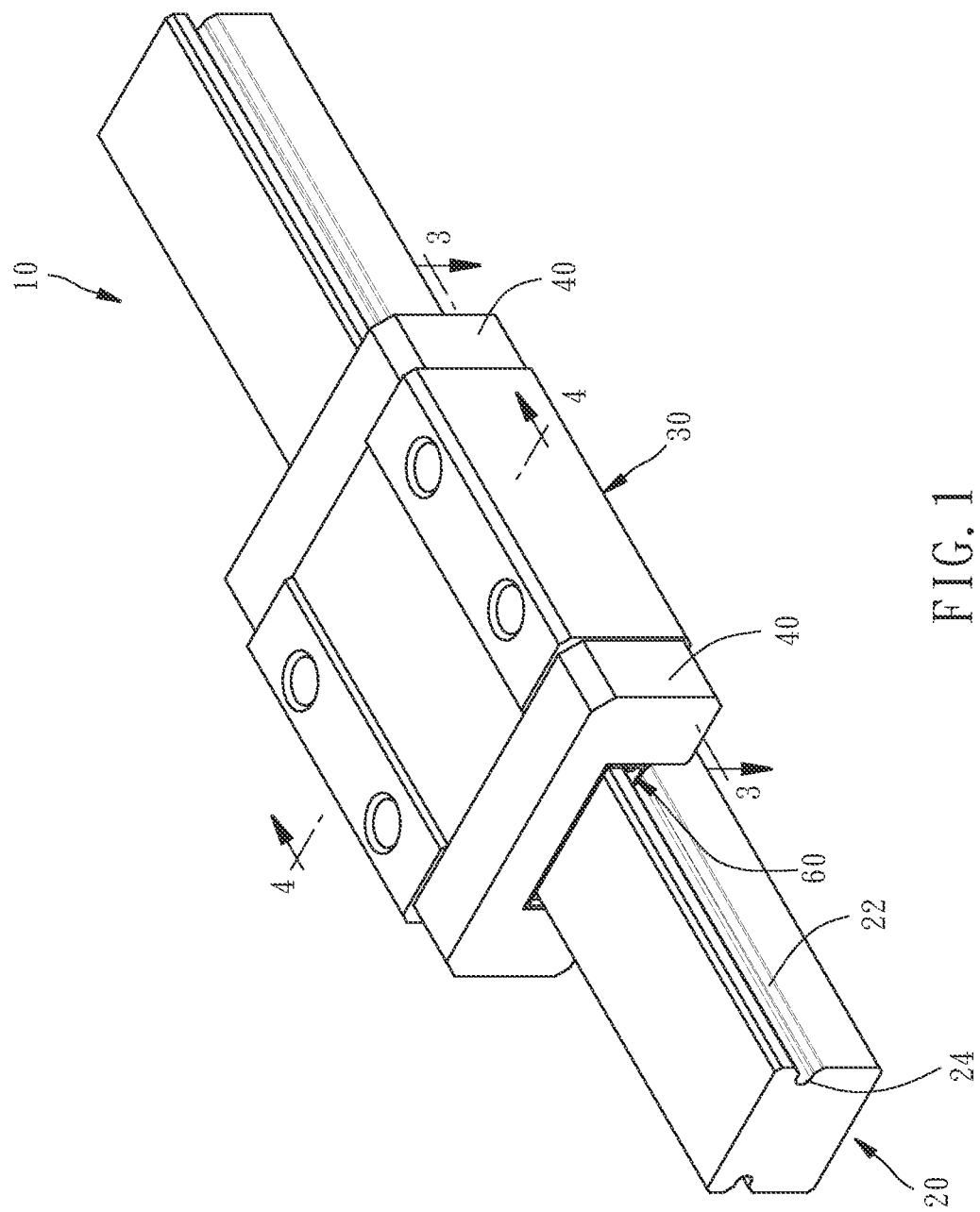
FIG. 1 is an elevational view of the miniature linear guideway of the first embodiment of the present invention.

The applicant first explains here that throughout the specification, including the embodiments described below and the claims in the scope of the patent application, the nouns related to directionality are based on the directions in the drawings. Secondly, in the embodiments and drawings that will be introduced below, the same element numbers represent the same or similar elements or their structural features.

Please refer to FIG. 1 first, the miniature linear guideway 10 of the first embodiment of the present invention is suitable for miniaturized precision equipment or occasions with space constraints, in terms of size, the height is about 1 cm, and the width is about 2 cm. Please continue to refer to FIG. 1 and FIG. 2, the miniature linear guideway 10 of the first embodiment of the present invention includes a rail 20, a slider 30, two circulation fittings 40, a plurality of balls 50, and a retainer 60.

The left and right sides of the rail 20 respectively have a first rolling groove 22 and a retaining groove 24 adjacent to the first rolling groove 22.

Figure 2:
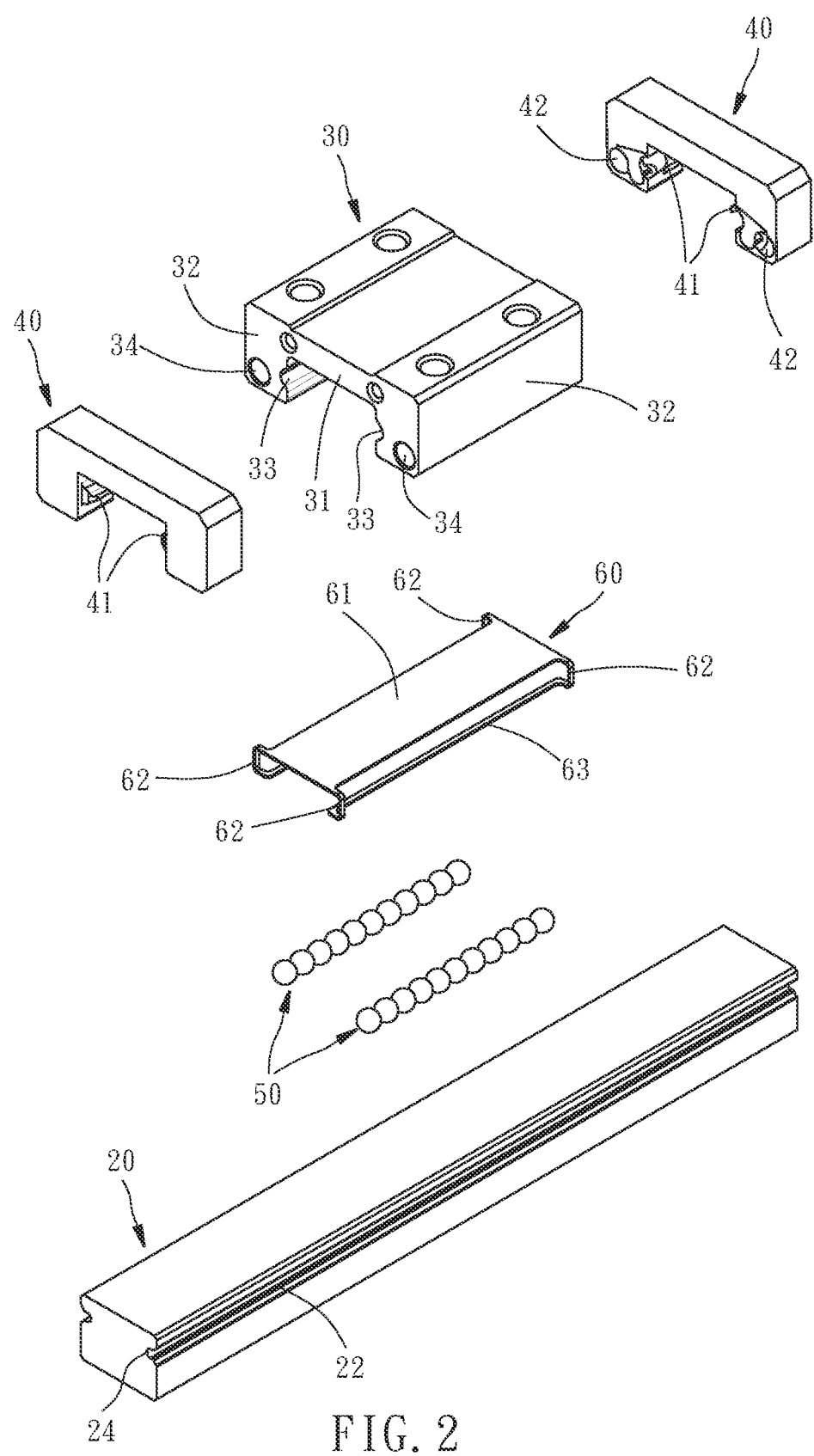
FIG. 2 is an exploded view of the miniature linear guideway of the first embodiment of the present invention.
Figure 3:
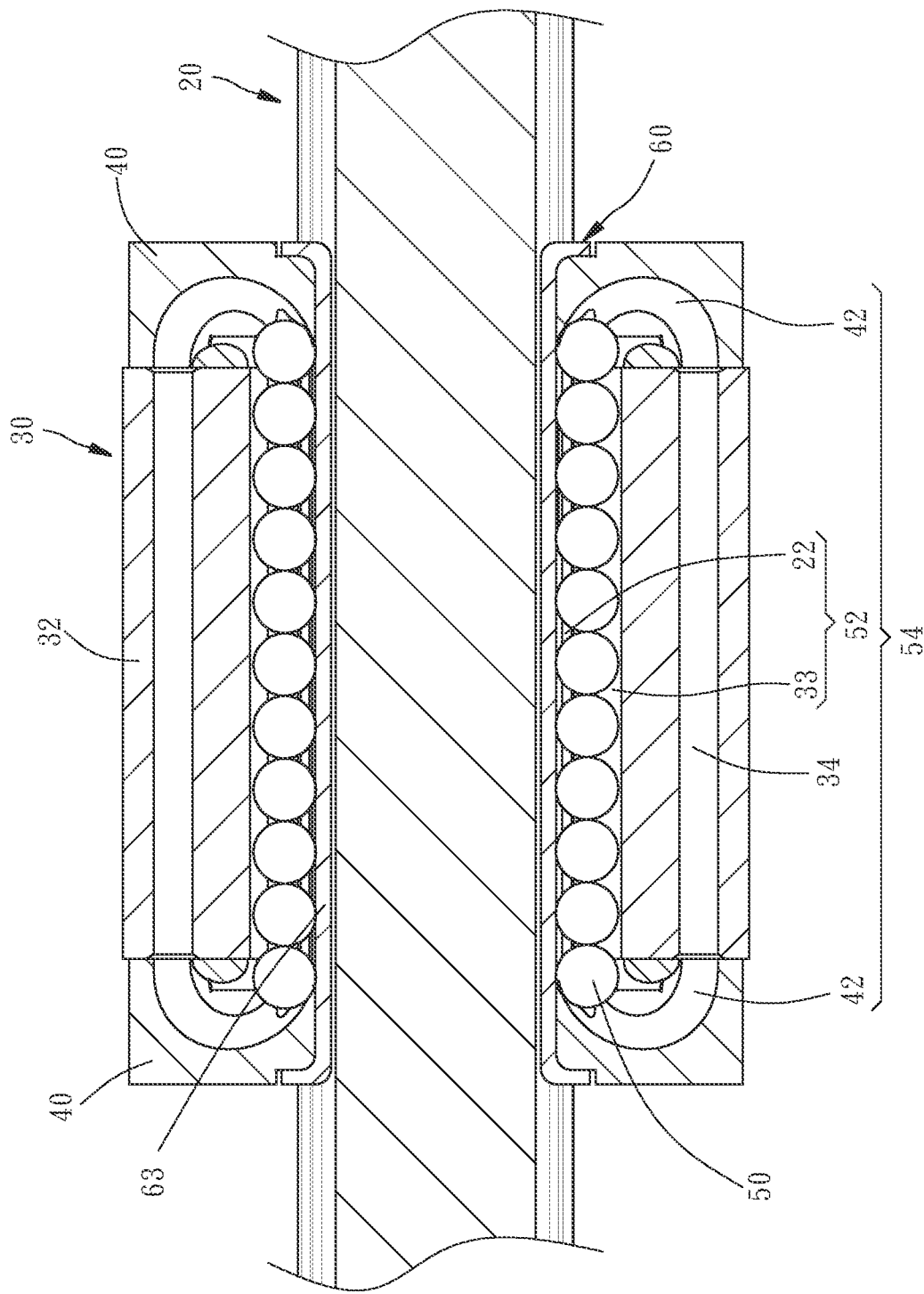
FIG. 3 is a sectional view taken along line 3-3 of FIG. 1.

The slider 30 has a middle portion 31 and two side portions 32 connected to the middle portion 31 oppositely, and the inner side of each side portion 32 has a second rolling groove 33. The slider 30 is set on the rail 20 in a slidable manner, so that the second rolling grooves 33 of the slider 30 correspond to the first rolling grooves 22 of the rail 20 in a one-to-one manner. Thereby, a load channel 52 is formed between the second rolling grooves 33 of the slider 30 and the first rolling grooves 22 of the rail 20, respectively. In addition, as shown in FIG. 2 and FIG. 3, each side portion 32 further has a non-load channel 34, and the non-load channel 34 penetrates the front and rear end surfaces of the side portion 32.

The circulation fittings 40 are arranged on the front and rear end faces of the slider 30. The left and right ends of each circulation fitting 40 respectively have a turning convex portion 41 and a return groove 42 adjacent to the turning convex portion 41. The two ends of each return groove 42 are connected to one end of the load channel 52 and one end of the non-load channel 34, so that the load channel 52, the non-load channel 34 and the front and rear return grooves 42 together form a circulating channel 54 for the balls 50 to run (as shown in FIG. 3). In addition, as shown in FIG. 5, each circulation fitting 40 further has a receiving groove 43 adjacent to the turning convex portions 41.

Figure 7:
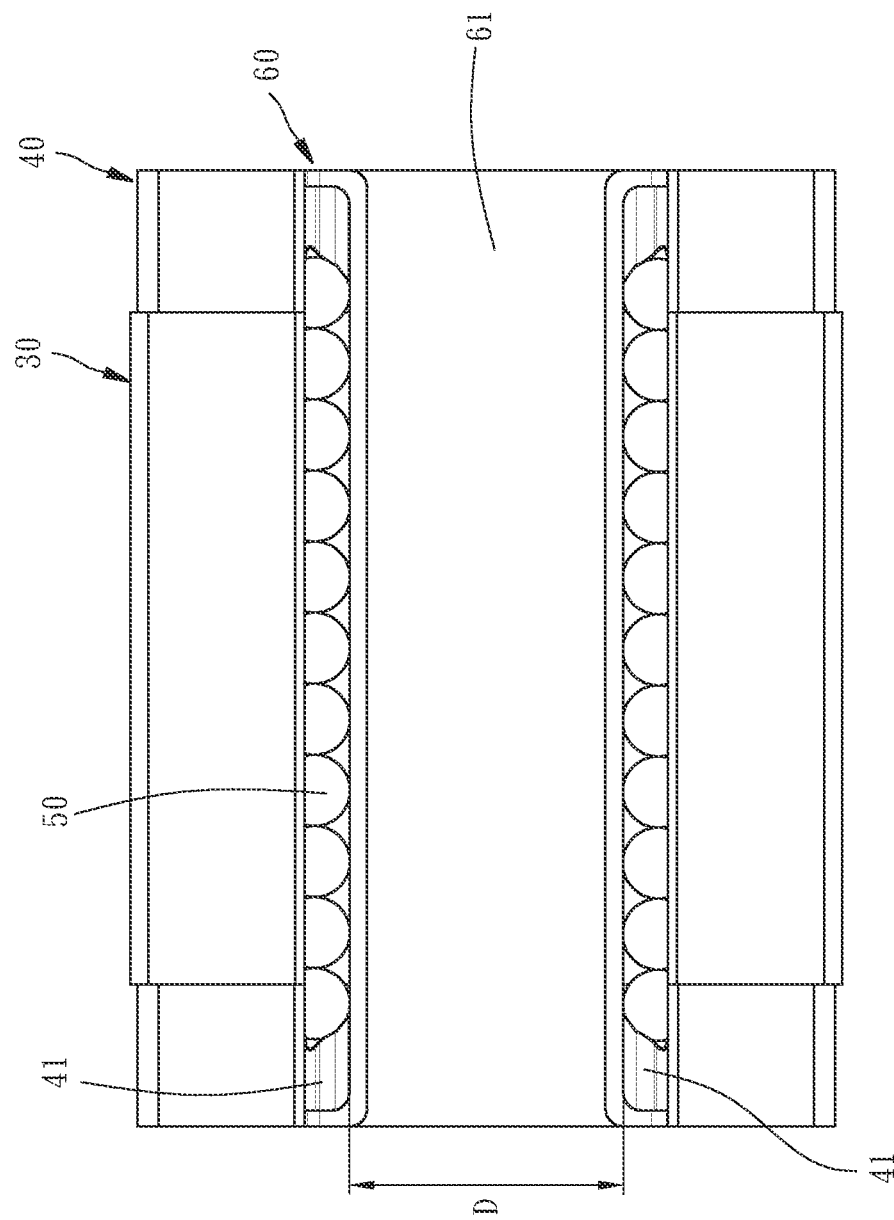
FIG. 7 is a bottom view of the miniature linear guideway omitting the rail according to the first embodiment of the present invention.
Figure 8:
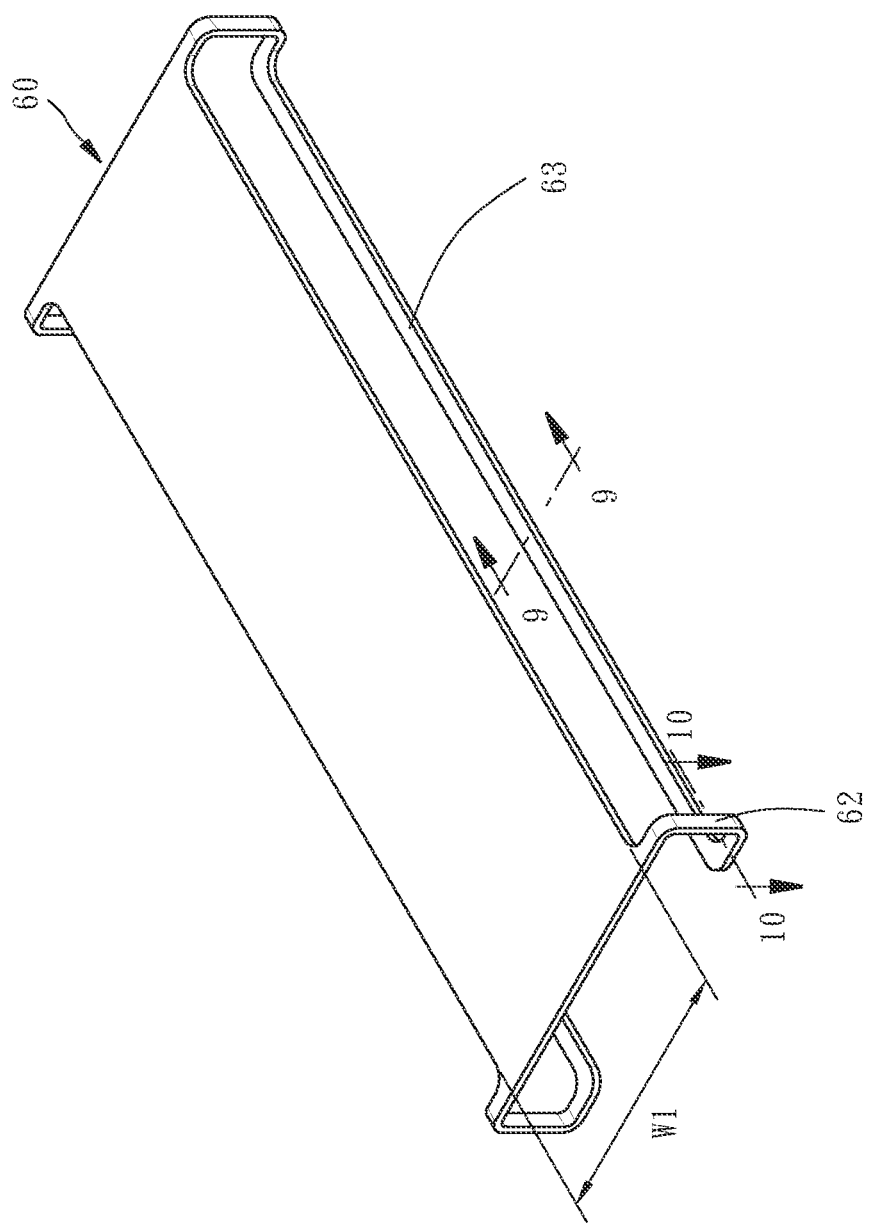
FIG. 8 is an elevational view of the retainer provided by the miniature linear guideway according to the first embodiment of the present invention.

The retainer 60 is a one-piece structure made of metal material by stamping. As shown in FIG. 2, the retainer 60 has a plate portion 61, four positioning portions 62 and two retaining portions 63. The plate portion 61 is rectangular, and the width W1 of the plate portion 61 is smaller than the distance D between the turning convex portions 41 (as shown in FIGS. 7 and 8). The positioning portions 62 are connected to the four corners of the plate portion 61 on the one hand, and to the two ends of the retaining portions 63 on the other hand.

Figure 4:
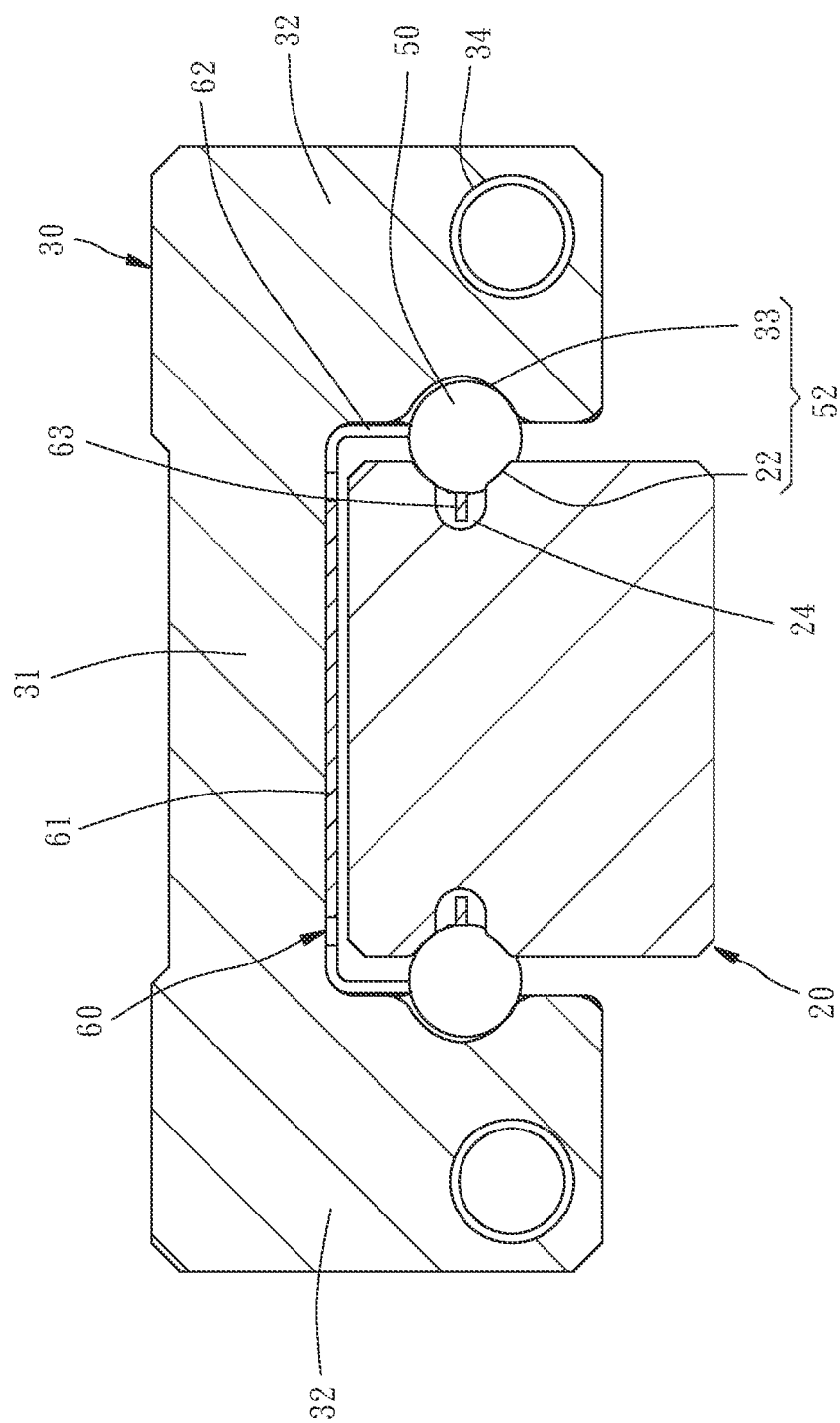
FIG. 4 is a sectional view taken along line 4-4 of FIG. 1.
Figure 5:
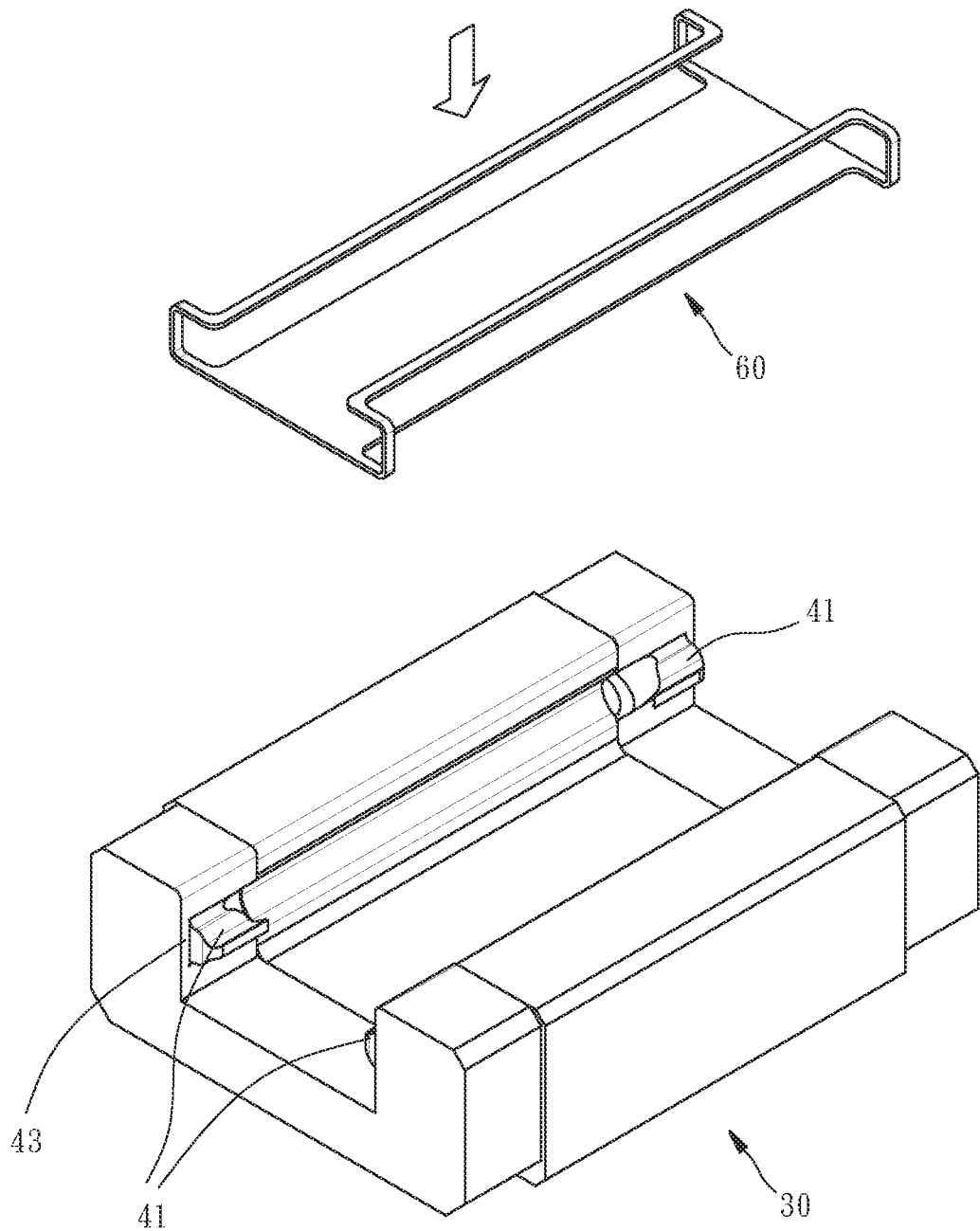
FIG. 5 is a partial exploded view of the miniature linear guideway omitting the rail according to the first embodiment of the present invention.
Figure 6:
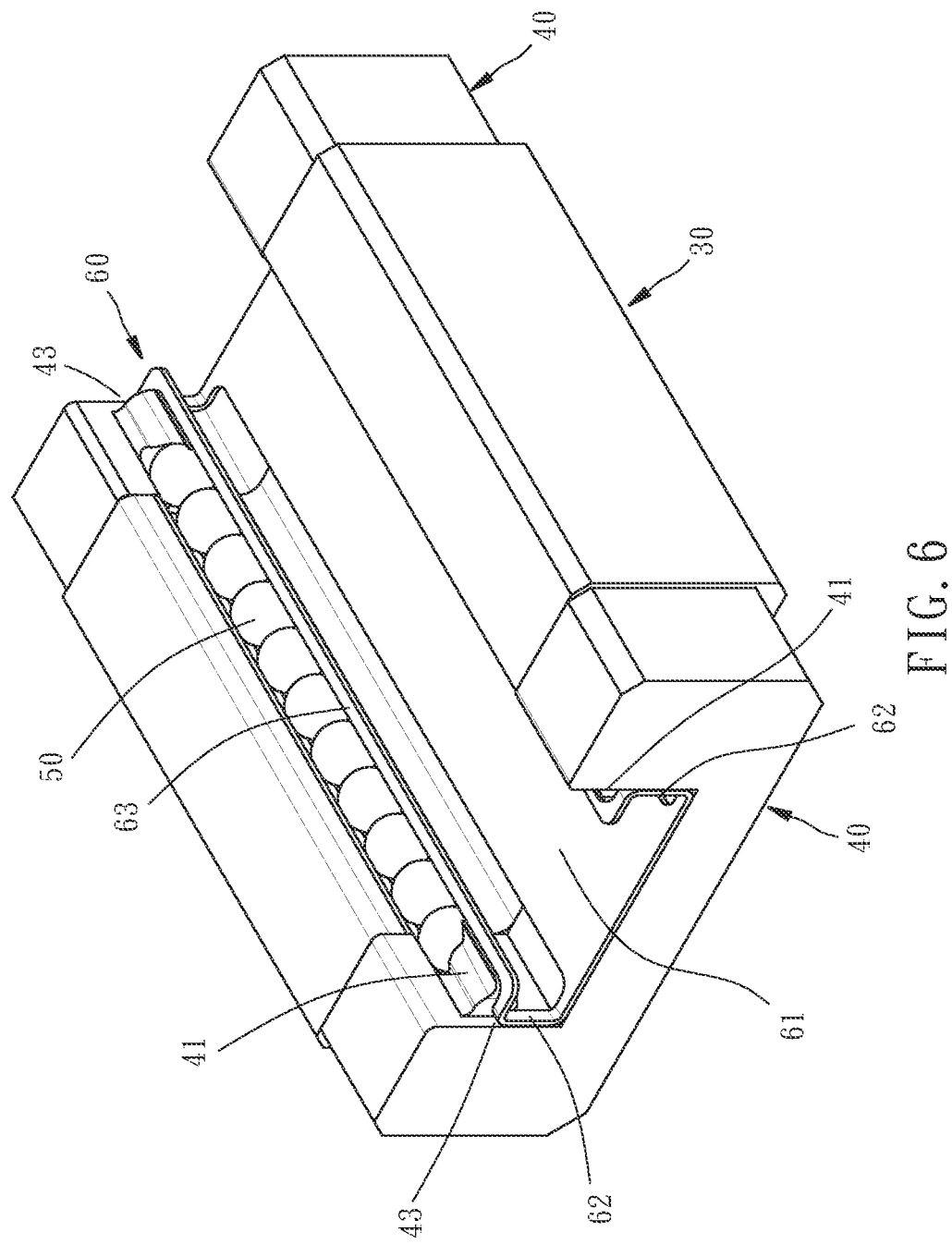
FIG. 6 is a combination diagram of FIG. 5.

During assembling, as shown in FIGS. 5 and 6, since the width W1 of the plate portion 61 is smaller than the distance D between the turning convex portions 41, the retainer 60 can be directly pressed into the slider 30 along a single direction to complete the assembly. After the assembly is completed, as shown in FIGS. 3 and 4, the plate portion 61 of the retainer 60 abuts against the middle portion 31 of the slider 30, and the positioning portions 62 of the retainer 60 abut the turning convex portions 41 of the circulation fittings 40 and are located in the receiving grooves 43 of the circulation fittings 40, so that the retainer 60 is positioned. Moreover, the retaining portions 63 of the retainer 60 are located within the retaining grooves 24 of the rail 20 and abut the balls 50 passing through the load channel 52, so that the retainer 60 provides a retaining effect to the balls 50 passing through the load channel 52.

Figure 9:
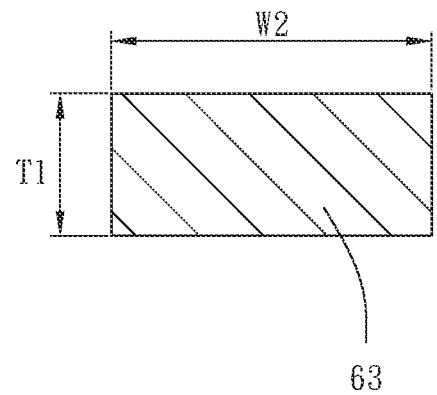
FIG. 9 is a sectional view taken along line 9-9 of FIG. 8.
Figure 10:
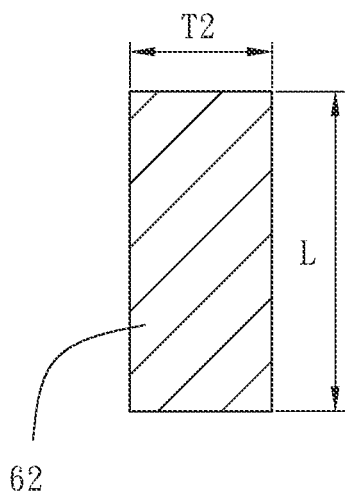
FIG. 10 is a sectional view taken along line 10-10 of FIG. 8.

On the other hand, as shown in FIGS. 8 and 9, the cross-sectional shape of the retaining portions 63 is rectangular, and the width-to thickness ratio of the retaining portions 63 is not less than 1.5, so that it can be ensured that the retaining portions 63 have sufficient structural strength and are not easily deformed to provide good retaining effect. As shown in FIGS. 8 and 10, the cross-sectional shape of each positioning portion 62 is also rectangular, and the length-to-thickness ratio of each positioning portion 62 is not less than 1.5, so that each positioning portion 62 can be ensured to have sufficient structural strength and not easily deformed, in order to provide a good positioning effect.

In order to further improve the structural stability of the retainer 60, the slider 30, the circulation fittings 40 and the retainer 60 are positioned with different structural in the following embodiments.

Figure 11:
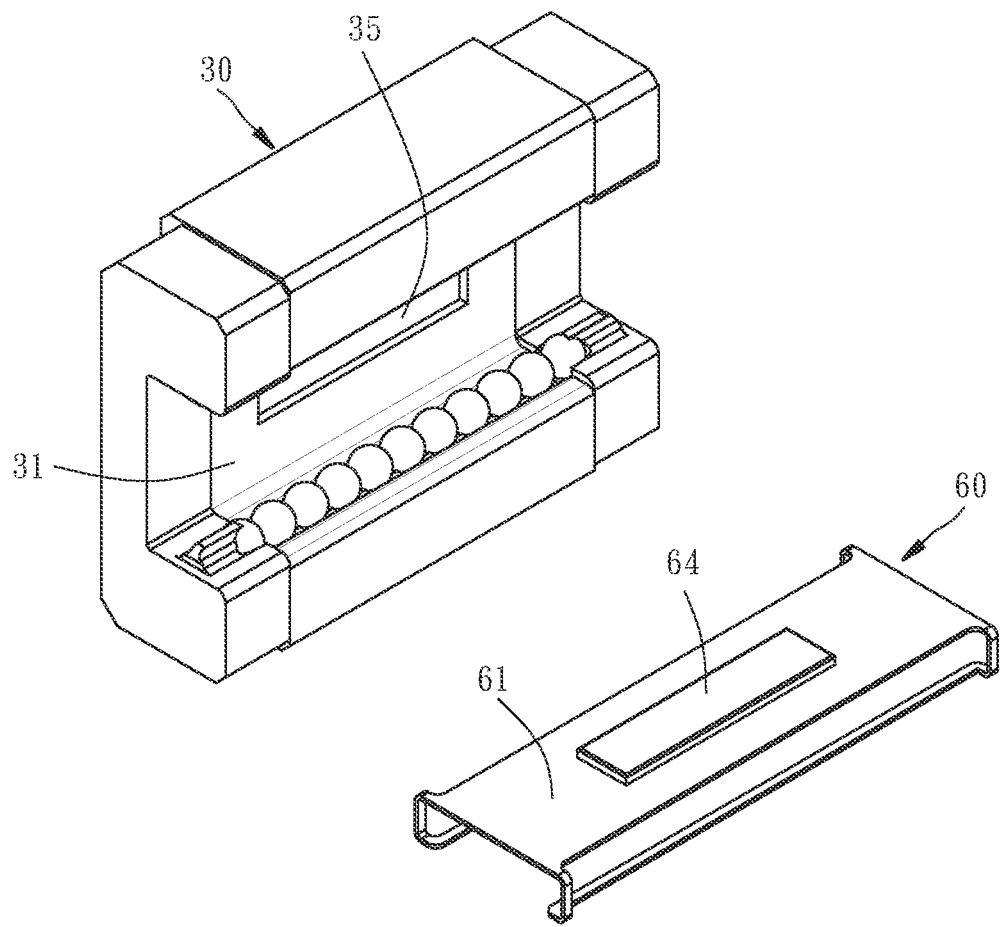
FIG. 11 is a partial exploded view of the miniature linear guideway omitting the rail according to the second embodiment of the present invention.
Figure 12:
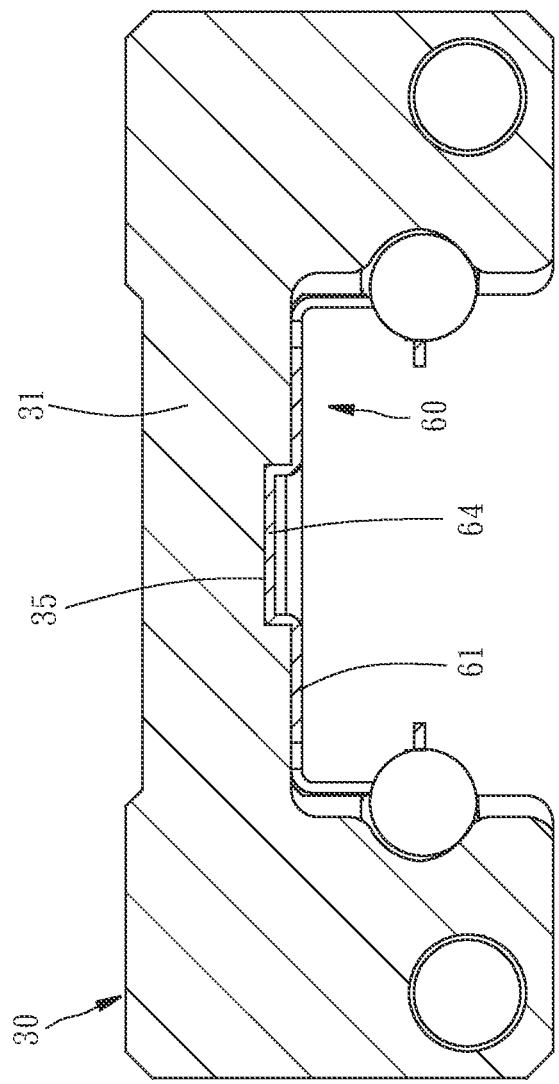
FIG. 12 is a cross-sectional view of the miniature linear guideway omitting the rail according to the second embodiment of the present invention.

As shown in FIG. 11, in the second embodiment of the present invention, the bottom surface of the middle portion 31 of the slider 30 has a recess 35 which is rectangular-shaped, and the retainer 60 protrudes upward from the plate portion 61 with a convex portion 64 which is rectangular-shaped. When the retainer 60 is pressed into the slider 30, the convex portion 64 of the retainer 60 is simultaneously embedded in the recess 35 of the slider 30, as shown in FIG. 12, so that the positioning effect between the two can be improved.

Figure 13:
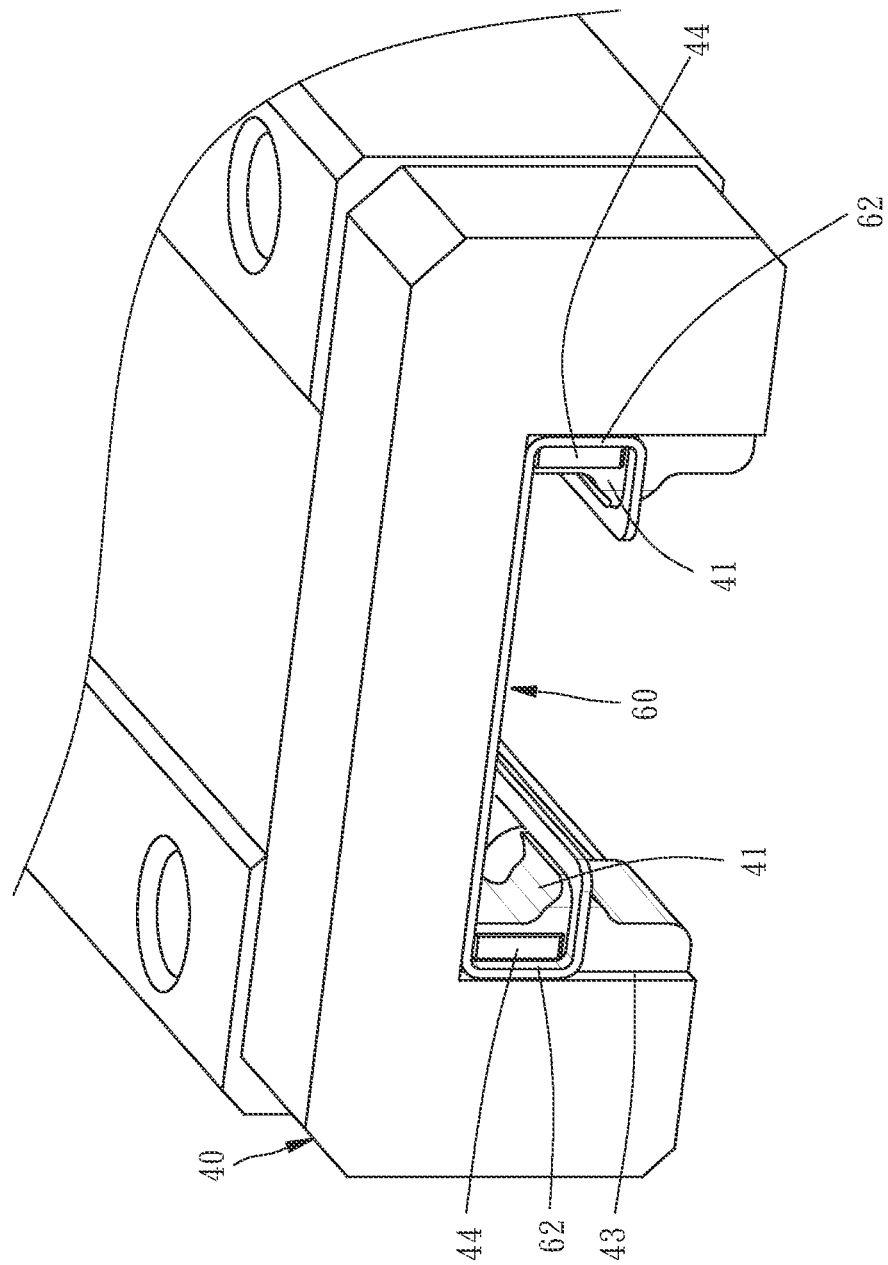
FIG. 13 is a partial elevational view of the miniature linear guideway omitting the rail according to the third embodiment of the present invention.

As shown in FIG. 13, in the third embodiment of the present invention, each circulation fitting 40 further has two positioning blocks 44, and each positioning block 44 protrudes into the receiving groove 43 from the turning convex portion 41 along the extending direction of the rail 20. After the assembly of the retainer 60 is completed, the positioning portions 62 of the retainer 60 are engaged with the positioning blocks 44 of the circulation fittings 40 in a one-to-one manner, so that the positioning effect between the two can be improved.

Figure 14:
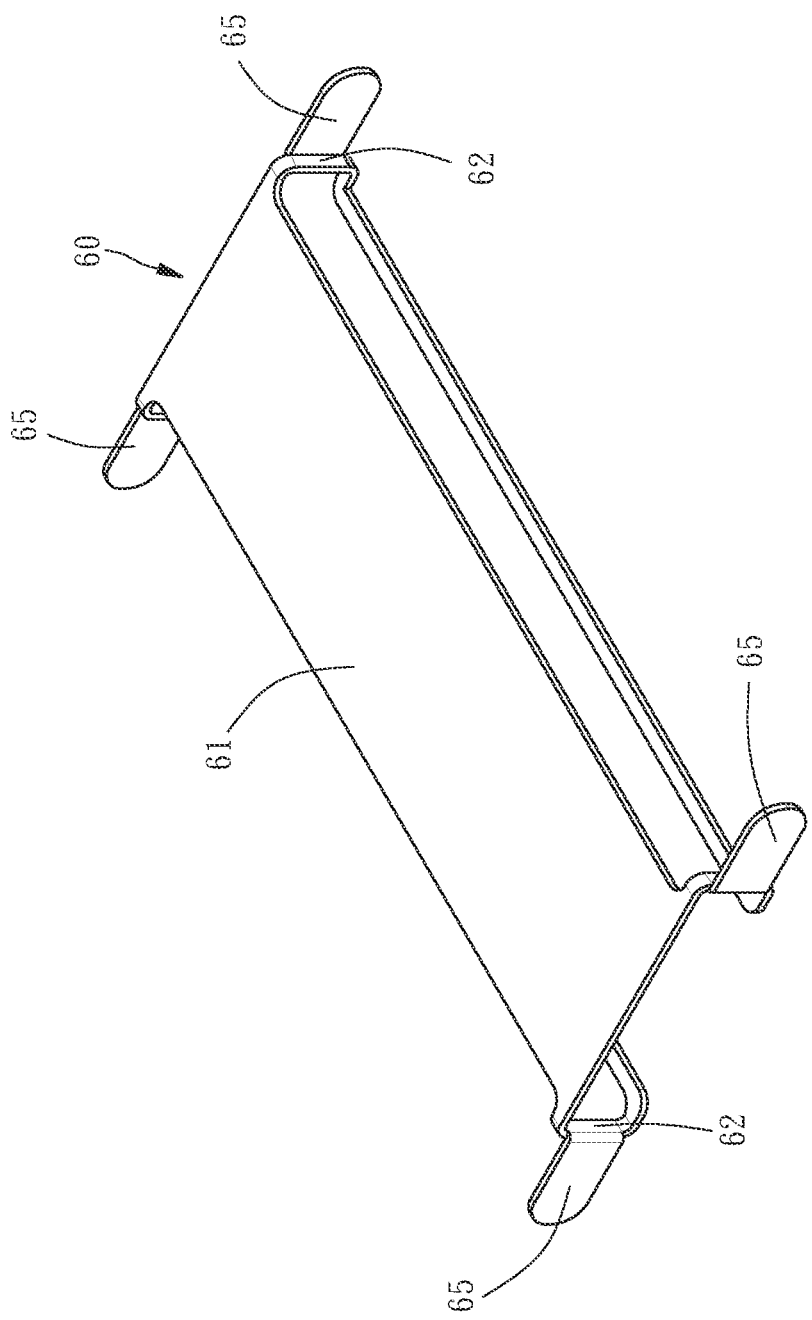
FIG. 14 is an elevational view of the retainer provided by the miniature linear guideway according to the fourth embodiment of the present invention.
Figure 15:
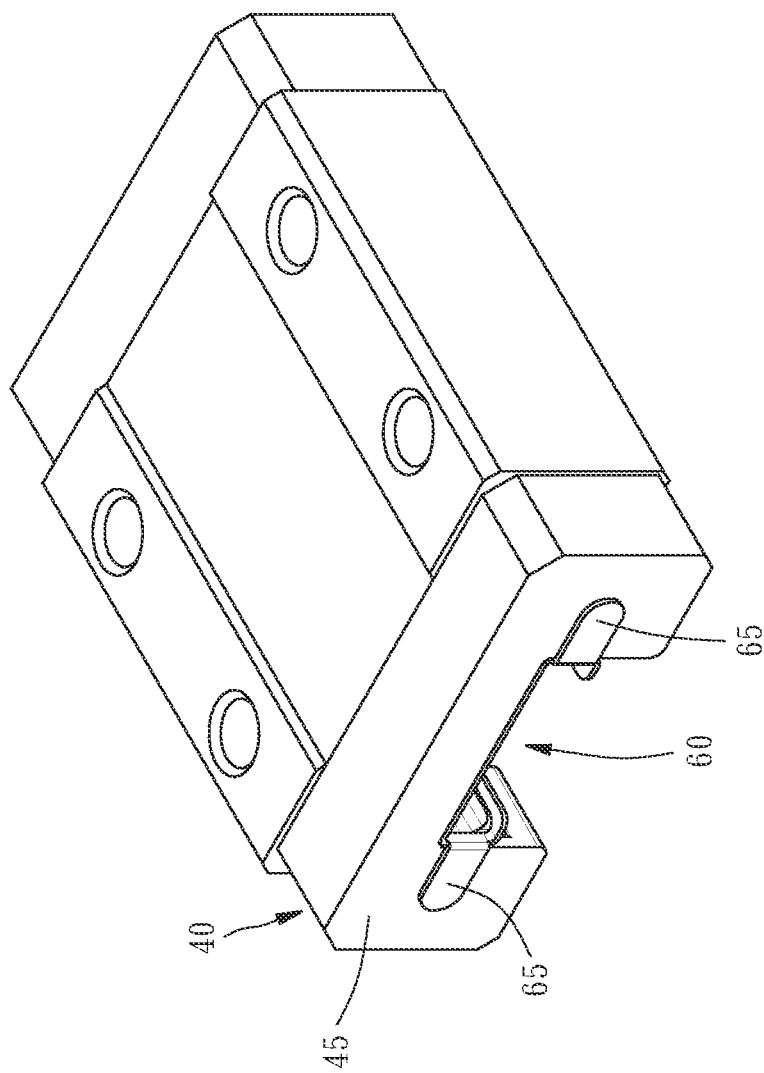
FIG. 15 is an elevational view of the miniature linear guideway omitting the rail according to the fourth embodiment of the present invention.
Figure 16:
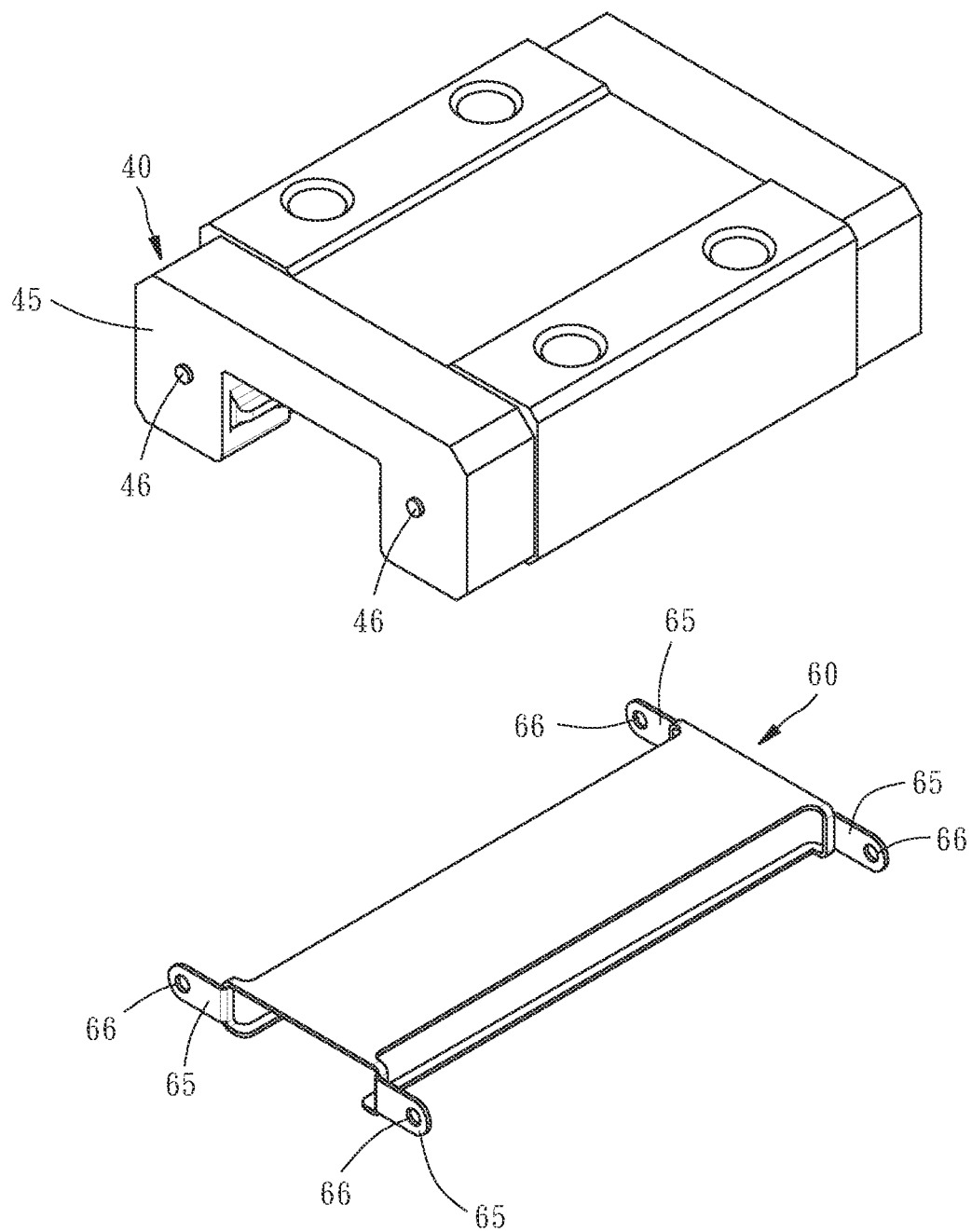
FIG. 16 is an exploded view of the miniature linear guideway omitting the rail according to the fifth embodiment of the present invention.
Figure 17:
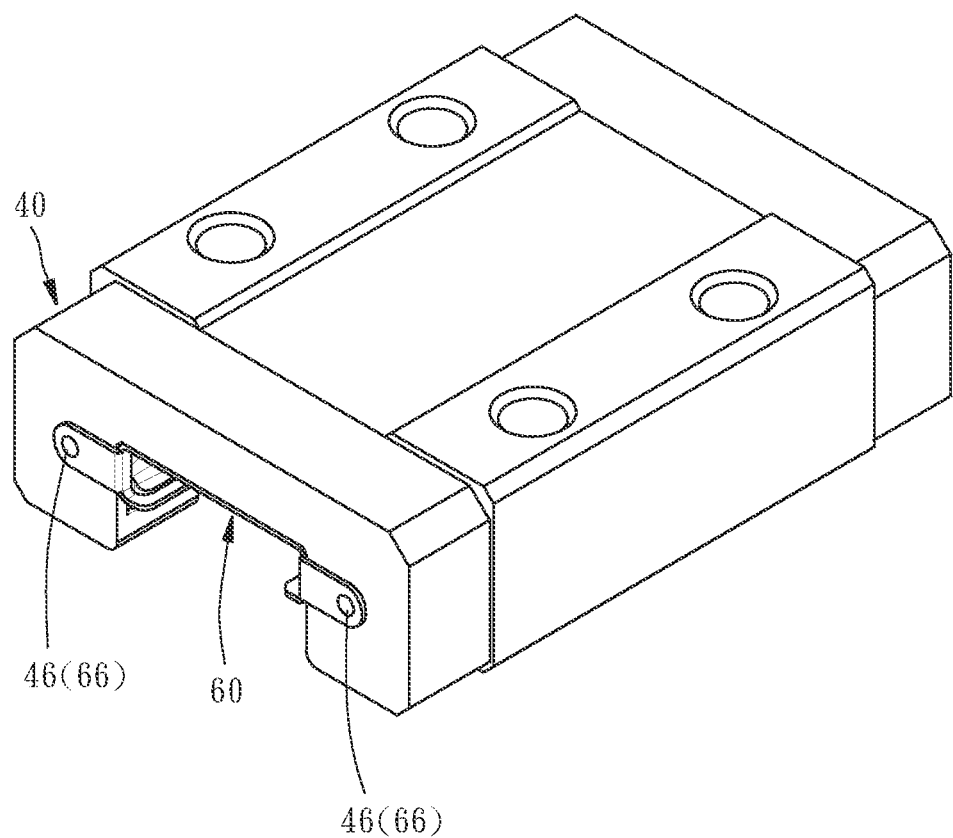
FIG. 17 is an elevational view of the miniature linear guideway omitting the rail according to the fifth embodiment of the present invention.

As shown in FIG. 14, in the fourth embodiment of the present invention, the retainer 60 further has four wing portions 65, and each wing portion 65 extends horizontally from one respective positioning portion 62 in a direction away from the plate portion 61. When the retainer 60 is assembled, as shown in FIG. 15, the wing portions 65 of the retainer 60 abut against the outer end surfaces 45 of the circulation fittings 40, so that the retainer 60 has a clamping effect. As shown in FIGS. 16 and 17, in the fifth embodiment of the present invention, the outer end surface 45 of each circulation fitting 40 further provides two positioning posts 46, and each wing portion 65 of the retainer has a positioning hole 66. The retainer is clamped to the positioning posts 46 of the circulation fitting 40 with the positioning holes 66 of the wing portions 65 in a one-to-one manner to enhance the positioning effect between the two.

Figure 18:
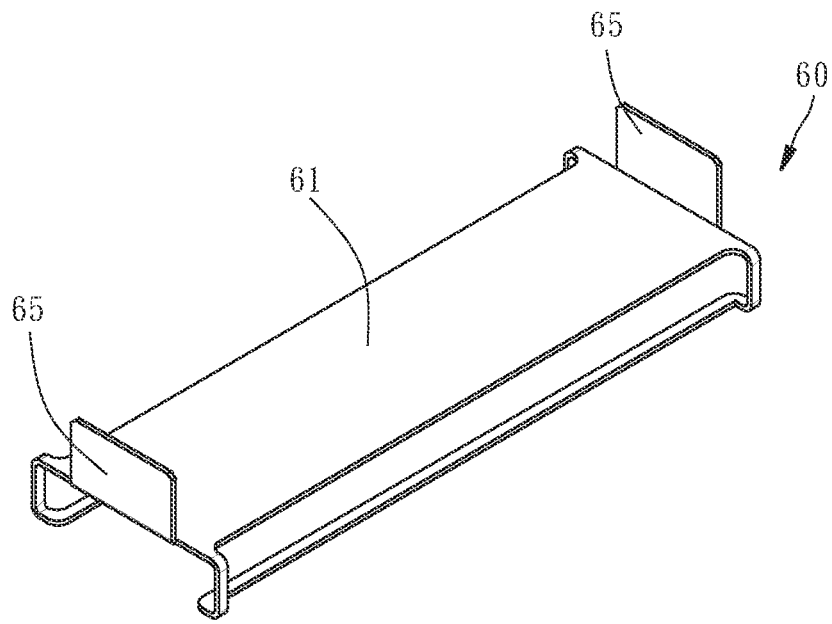
FIG. 18 is an elevational view of the retainer provided by the miniature linear guideway according to the sixth embodiment of the present invention.
Figure 19:
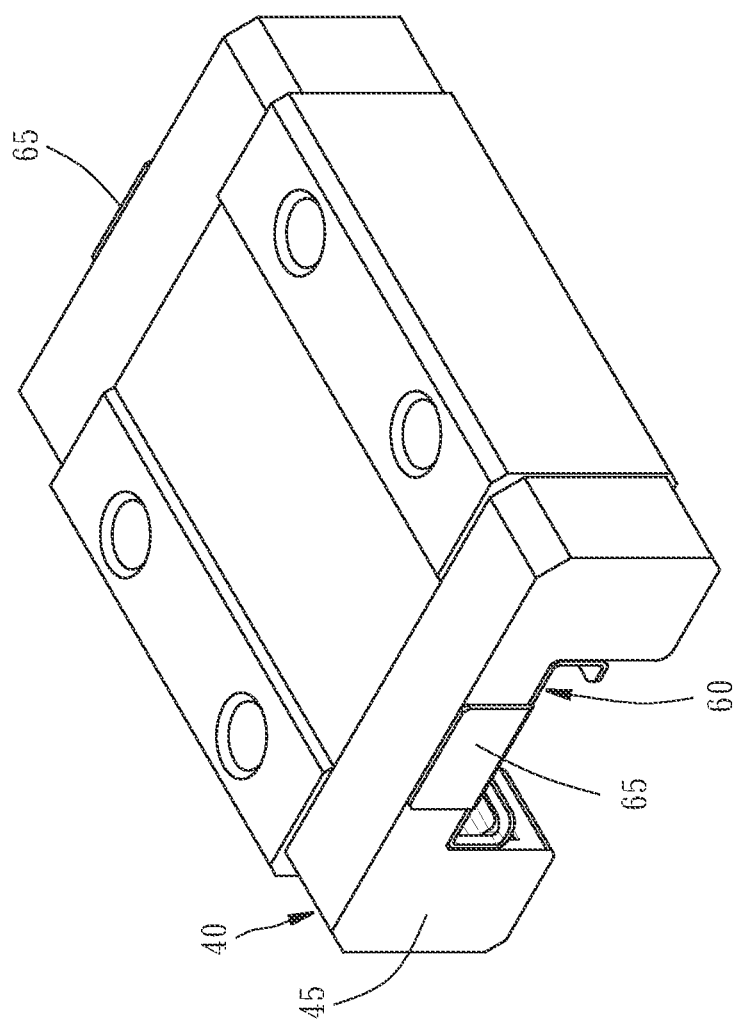
FIG. 19 is an elevational view of the miniature linear guideway omitting the rail according to the sixth embodiment of the present invention.
Figure 20:
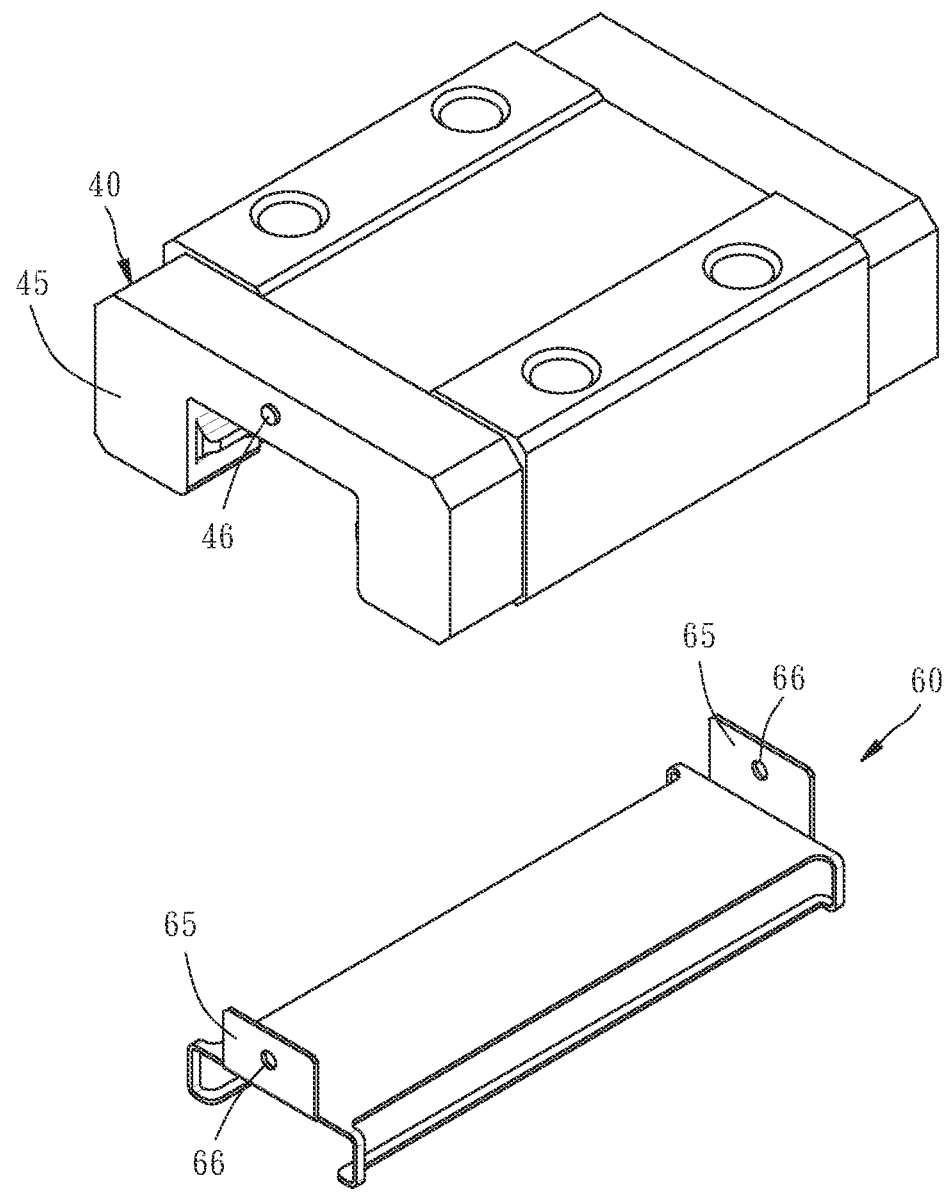
FIG. 20 is an exploded view of the miniature linear guideway omitting the rail according to the seventh embodiment of the present invention.
Figure 21:
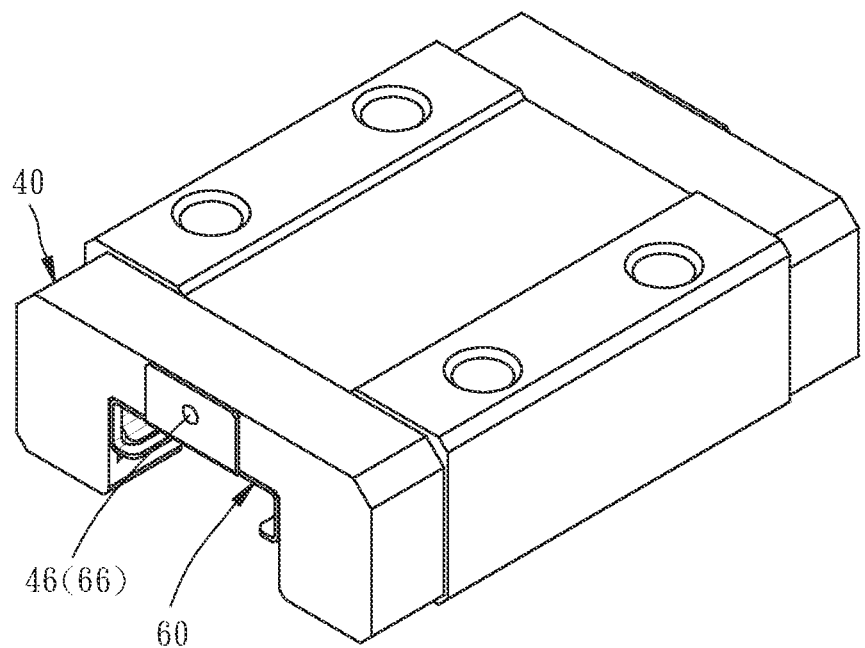
FIG. 21 is an elevational view of the miniature linear guideway omitting the rail according to the seventh embodiment of the present invention.

However, the number and position of wing portions 65 can be varied. As shown in FIG. 18, in the sixth embodiment of the present invention, the retainer 60 further has two wing portions 65, and the wing portions 65 extend upward from the two ends of the retaining portion 63. After the assembly of the retainer 60 is completed, as shown in FIG. 19, the two wing portions 65 of the retainer 60 abut against the outer end surface 45 of each circulation fitting 40 respectively, so that the retainer 60 can also produce a clamping effect. In addition, as shown in FIGS. 20 and 21, in the seventh embodiment of the present invention, the outer end surface 45 of each circulation fitting 40 has a positioning post 46, and each wing portion 65 of the retainer 60 has a positioning hole 66. The retainer 60 is clamped to the positioning posts 46 of the circulation fittings 40 by the positioning holes 66 of the wing portions 65 to enhance the positioning effect between the two.

Figure 22:
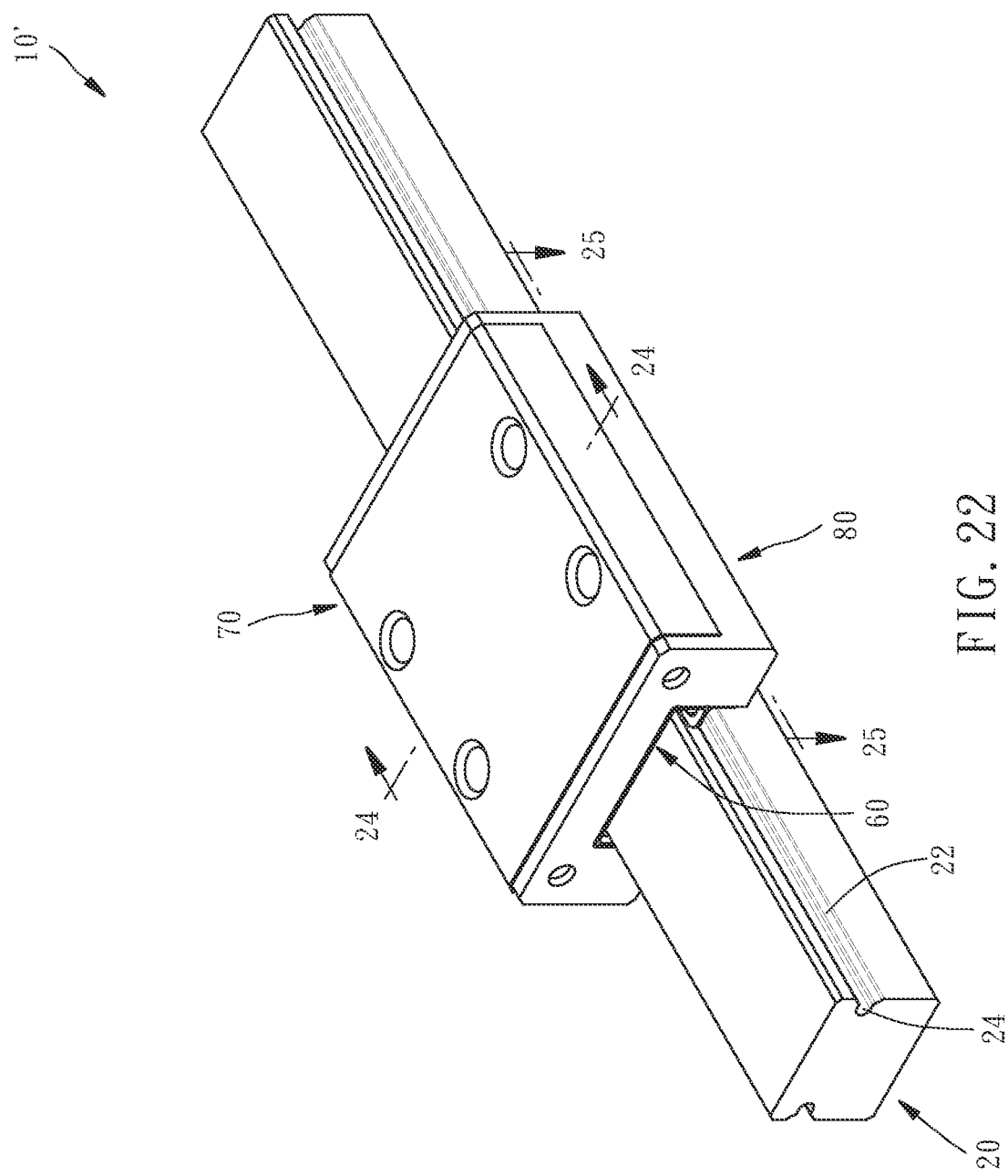
FIG. 22 is an elevational view of the miniature linear guideway of the eighth embodiment of the present invention.

On the other hand, the number of circulation fittings is two in the above-mentioned embodiments. In fact, the number of circulation fittings can be set to only one according to the rails of different configurations. Further, referring to FIGS. 22 and 23, the miniature linear guideway 10' of the eighth embodiment of the present invention comprises a rail 20, a slider 70, a circulation fitting 80, a plurality of balls 50, and a retainer 60.

The left and right sides of the rail 20 respectively have a first rolling groove 22 and a retaining groove 24 adjacent to the first rolling groove 22.

Each side portion 72 of the slider 70 has two parallel second rolling grooves 73 and two opposite first return grooves 74. The first return grooves 74 are adjacent to the two ends of the respective second rolling grooves 73. The slider 70 is set on the rail 20, so that a load channel 52 is formed between one of the second rolling grooves 73 of each side portion 72 of the slider 70 and one respective first rolling groove 22 of the rail 20 (as shown in FIG. 24).

Figure 23:
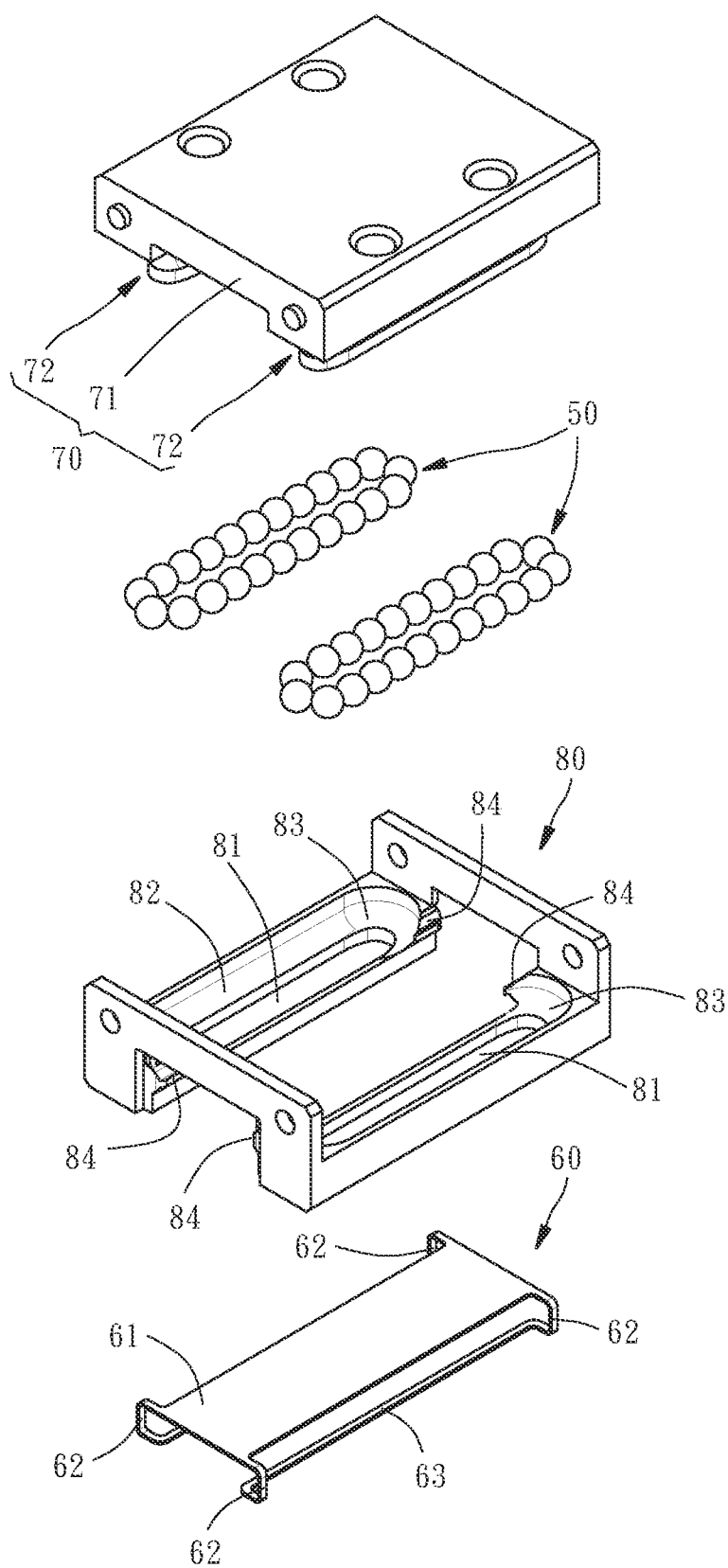
FIG. 23 is an exploded view of the miniature linear guideway omitting the rail according to the eighth embodiment of the present invention.
Figure 25:
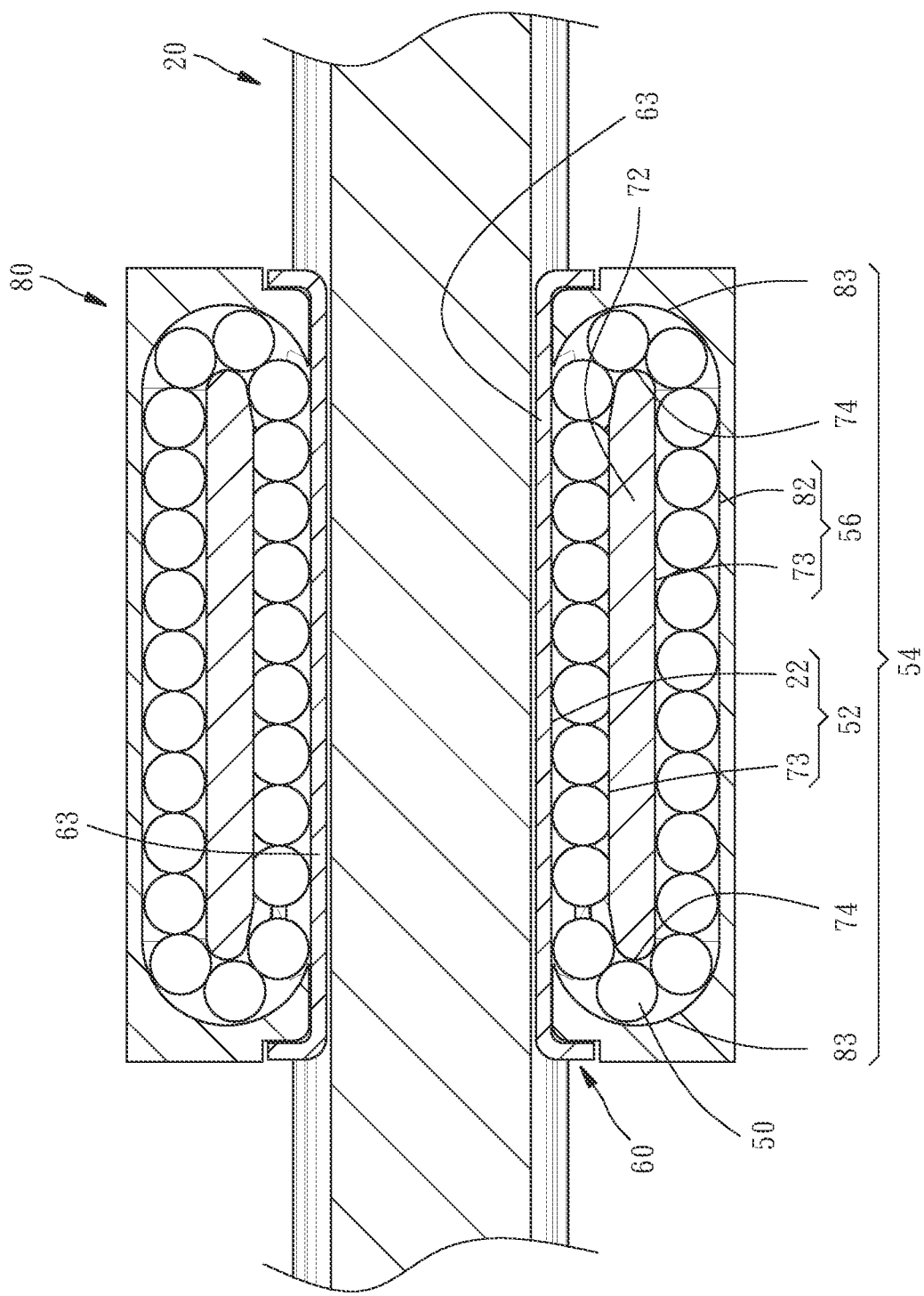
FIG. 25 is a sectional view taken along line 25-25 of FIG. 22.

The circulation fitting 80 has two opposite socket grooves 81, and a third rolling groove 82 and two opposite second return grooves 83 are arranged around each socket groove 81. These second return grooves 83 join the two ends of the third rolling groove 82. Each side portion 72 of the slider 70 is set in one respective socket groove 81 of the circulation fitting 80, so that a non-non-load channel 56 is formed between the other second rolling groove 73 of each side portion 72 of the slider 70 and the third rolling groove 82 of the circulation fitting 80, and the first return grooves 74 of each side portion 72 of the slider 70 correspond to the second return grooves 83 of the circulation fitting 80. Thereby, as shown in FIG. 25, the load channel 52, the non-load channel 56, the first return grooves 74 and the second return grooves 83 together constitute a circulating channel 54 for the balls 50 to run. In addition, as shown in FIG. 23, the circulation fitting 80 further has four turning convex portions 84, and each turning convex portion 84 is adjacent to one respective second return groove 83.

The retainer 60 is pressed directly into the slider 30 in a single direction to complete the assembly.

Figure 24:
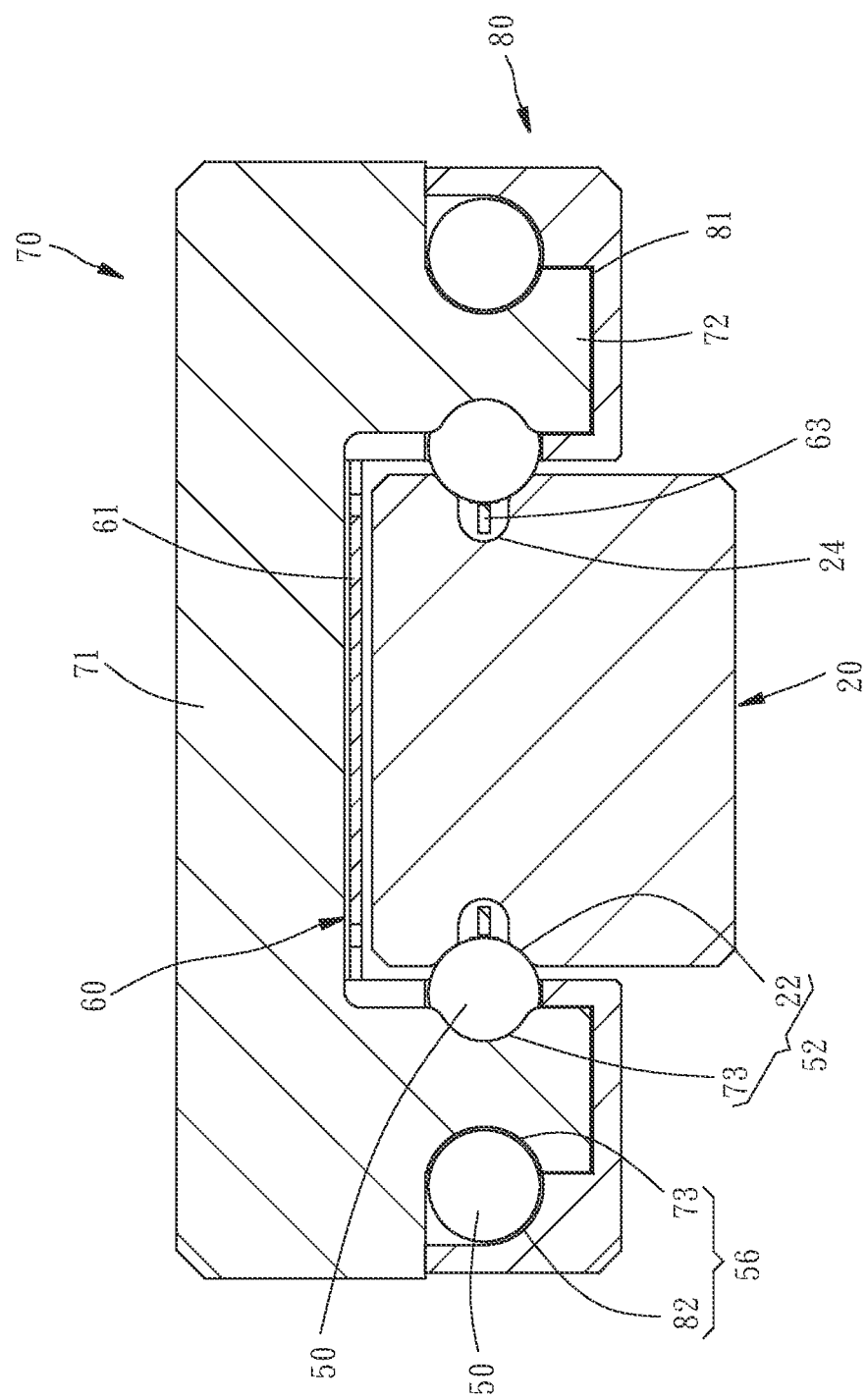
FIG. 24 is a sectional view taken along line 24-24 of FIG. 22.

As shown in FIG. 24 and FIG. 25, the plate portion 61 of the retainer 60 is adjacent to the middle portion 71 of the slider 70, and the positioning portions 62 of the retainer 60 abut the turning convex portions 84 of the circulation fitting 80, so that the retainer 60 is positioned, and the retaining portions 63 of the retainer 60 are located in the retaining grooves 24 of the rail 20 and abut against the balls 50 passing through the load channel 52, so that the retainer 60 provides a retaining effect to the balls 50 passing through the load channel 52.

To sum up, the retainer 60 provided by the present invention is pressed in a single direction to complete the assembly with the slider 30, which is relatively easy to assemble, reduces the assembly process, and can be matched with different structural designs to improve the positioning effect. Therefore, the assembly efficiency can be effectively improved and the assembly cost can be reduced, thereby realizing the purpose of automatic assembling.

What is claimed is:

1. A linear guideway, comprising:
   a rail;
   a slider slidably arranged on said rail, said slider comprising a middle portion and two side portions connected to two opposite sides of said middle portion;
   at least one circulation fitting slidably disposed on said rail and connected to said slider, so that said at least one circulation fitting forms a circulation channel between said rail and each of said side portions of said slider, said at least one circulation fitting comprising a plurality of turning convex portions, wherein the plurality turning convex portions are spaced apart on said at least one circulation fitting;
   a plurality of balls located in said circulating channels; and
   a retainer comprising a plate portion, a plurality of positioning portions and two retaining portions, said retaining portions each having two ends and each end is connected to said plate portion by one respective said positioning portion, said plate portion of said retainer being adjacent to said middle portion of said slider, said positioning portions of said retainer abutting against said turning convex portions of said at least one circulation fitting, each of said retaining portions of said retainer abutting against said balls, wherein, the width of said plate portion of said retainer is smaller than a distance between said turning convex portions of said at least one circulation fitting.

2. The linear guideway as claimed in claim 1, wherein the rail has two sides each provided with a first rolling groove and a retaining groove adjacent to said first rolling groove;
   wherein each said side portion of said slider is provided with a second rolling groove, said second rolling grooves of said slider corresponding to said first rolling grooves of said rail in a one-to-one relationship, so that a load channel is formed between said second rolling grooves of said slider and said first rolling grooves of said rail respectively,
   wherein each said side portion of said slider comprises a non-load channel, each of said non-load channels penetrating two opposite end faces of said side portion;
   wherein the linear guideway includes two said circulation fittings, and said two circulation fittings being arranged on two opposite end faces of said slider, each gf said circulation fittings comprising two turning convex portions and two return grooves,
   wherein each said return groove is adjacent to one respective said turning convex portion, two ends of each said return groove being connected to one end of said load channel and one end of said non-load channel, so that said load channel, said non-load channel and said two return grooves together form one said circulating channel,
   wherein each of said retaining portions of said retainer being located in one respective said retaining groove of said rail and abutting said balls that pass through one said load channel.

3. The linear guideway as claimed in claim 2, wherein said retainer further comprises a plurality of wing portions, said wing portions extending horizontally from respective said positioning portions in a direction away from said plate portion and respectively abutting against an outer end surface of a respective circulation fitting.

4. The linear guideway as claimed in claim 3, wherein said outer end surface of said each said circulation fitting is provided with a plurality of positioning posts; each said wing portion of said retainer is provided with a positioning hole, said positioning holes of said retainer being respectively engaged with said positioning posts of said at least one circulation fitting.

5. The linear guideway as claimed in claim 2, wherein said retainer further comprises a plurality of wing portions, each said wing portion extending upward from one end of said retaining portion and abutting on an outer end surface of a respective circulation fitting.

6. The linear guideway as claimed in claim 1, wherein the rail has two sides each provided with a first rolling groove and a retaining groove adjacent to said first rolling groove, wherein each said side portion of said slider comprises two parallel second rolling grooves and two opposite first return grooves;

wherein a load channel is formed between one said second rolling groove of each said side portion of said slider and one respective said first rolling groove of said rail;

wherein the linear guideway includes one said circulation fitting said circulation fitting further comprising two opposite socket grooves and four turning convex portions, wherein a third rolling groove and two opposite second return grooves being set around each said socket groove, said second return grooves being connected to both ends of said third rolling groove, one of said second rolling grooves of each said side portion of said slider corresponding to one respective said first rolling groove of said rail, and the other said second rolling groove of each said side portion of said slider corresponding to one said third rolling groove of said one circulation fitting, wherein said first return grooves of each of said side portions of said slider corresponding to said second return grooves of said one circulation fitting, so that one of said first rolling groove, said second rolling grooves, one said third rolling groove, said first return grooves and said second return grooves together form one said circulation channel, wherein each of said second return grooves being adjacent to one of said turning convex portions, each of said second return grooves being connected to one said load channel, wherein said retaining portions of said retainer being respectively located in said retaining grooves of said rail and abutting said balls passing through one said load channel.

7. The linear guideway as claimed in claim 1, wherein said slider comprises a recess located on a bottom surface of said middle portion; said retainer integrally protrudes upward from said plate portion with a convex portion, said convex portion of said retainer being embedded in said recess of said slider.

8. The linear guideway as claimed in claim 1, wherein said at least one circulation fitting further comprises a plurality of positioning blocks, each of said positioning blocks protruding from one of said turning convex portions along the extending direction of said rail; said positioning portions of said retainer are engaged with said positioning blocks of said at least one circulation fitting in a one-to-one manner.

9. The linear guideway as claimed in claim 1, wherein the cross-sectional shape of each said retaining portion along a reference frame perpendicular to the longitudinal axis of the retainer is rectangular, and the width-to-thickness ratio of each said retaining portion is equal to or larger than 1.5.

10. The linear guideway as claimed in claim 1, wherein the cross-sectional shape of each said positioning portion along a reference frame parallel to the longitudinal axis of the retainer is rectangular, and the length-to-thickness ratio of each said positioning portion is equal to or larger than 1.5.

* * * * *